United States Patent [19]

Chen et al.

[11] Patent Number: 4,802,679
[45] Date of Patent: Feb. 7, 1989

[54] BELL SEAL OF IMPROVED STABILITY FOR HIGH PRESSURE TURBINES

[75] Inventors: Shun Chen; Chin-Sheng Lee, both of Winter Springs, Fla.

[73] Assignee: Westinghouse Electric Corp., Pittsburgh, Pa.

[21] Appl. No.: 140,066

[22] Filed: Dec. 31, 1987

[51] Int. Cl.$^4$ .............................................. F16J 15/00
[52] U.S. Cl. .................... 277/12; 277/72 R; 277/DIG. 2
[58] Field of Search ............ 277/12, DIG. 2, 72, 277/DIG. 8, 70, 71, 94, 133, 3, 27, 96, 15; 415/138, 139, 219 R, 134-137

[56] References Cited

U.S. PATENT DOCUMENTS

| | | | |
|---|---|---|---|
| 3,907,307 | 9/1975 | Stock | 277/70 |
| 3,907,308 | 9/1975 | Stock | 277/72 R |
| 4,426,087 | 1/1984 | Sargent et al. | 277/3 |
| 4,743,162 | 5/1988 | Pope | 277/96 |

Primary Examiner—William A. Cuchlinski, Jr.
Assistant Examiner—Petar Arsenovic

[57] ABSTRACT

A bell seal assembly for the nozzle chamber unit of an elastic fluid turbine, such as the steam turbine used to drive electrical utility generators. The bell seal assembly includes a bell seal unit and a retaining nut unit; the seal skirt depends from a mounting flange. The outer skirt surface is subdivided into an upper skirt surface, an intermediate portion and a lower skirt margin. The intermediate portion is the primary skirt seal region, and the lower skirt margin is tapered inwardly toward the skirt end surface. The lower skirt margin includes a plurality of spaced apart, circumferentially extending grooves one of which terminates adjacent the lower edge of a sealing land on the primary seal portion of the skirt.

6 Claims, 1 Drawing Sheet

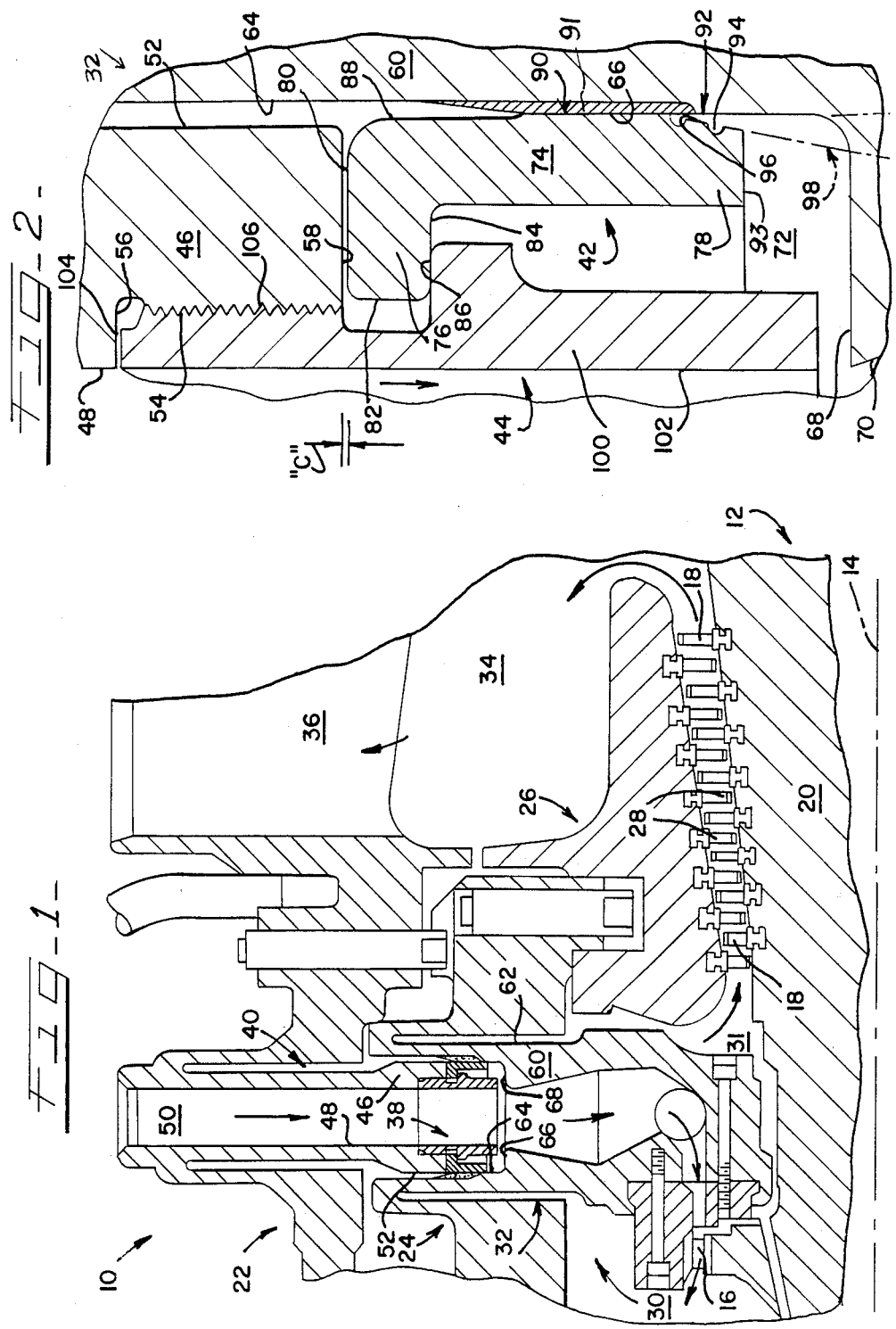

BELL SEAL OF IMPROVED STABILITY FOR HIGH PRESSURE TURBINES

BACKGROUND ON THE INVENTION

1. Field of the Invention

The presention invention relates generally to specialty seals, and more particularly, to so-called bell seal assemblies forming parts of high pressure steam turbines used, for example, in generating electricity.

2. Description of the Prior Art

While steam turbines of the kind used by electric utilities, for example, have been in use for a number of years and are recognized as a highly satisfactory method of power generation, the construction and arrangement of many turbines is such that they present difficult sealing problems in particular areas.

A typical steam turbine, wherein the high pressure section rotor is disposed within so-called inner and outer cylinders requires steam to pass without leakage between the cylinders. This requires a static seal which will withstand extremely high pressures, high temperatures, and differential thermal expansion; the seal must be substantially fluid-tight and remain stable under conditions of extremely high velocity, sometimes pulsating steam flow. Dynamic instability, vibration, and thermal shock are repeatedly encountered in use by bell seal assemblies. The prsent invention is directed to an improvement in seals of this type; one prior art version of such a bell seal is shown in U.S. Pat. No. 3,907,308.

A typical steam turbine unit of the type with which the invention is concerned includes a rotor assembly journaled for rotation about a given axis and surrounded by so-called inner and outer cylinders. The inner cylinder includes, among other parts, a blade carrier ring which forms a part of the turbine stator and several nozzle chamber units each welded to the inner cylinder so as to become an integral part thereof. The outer cylinder includes a high pressure steam exhaust outlet, and a number of so-called inlet sleeve units, each of which extends inwardly in telescoping relation to its associated nozzle chamber in the inner cylinder.

From each of several control valves, the steam enters the high-pressure turbine through an inlet sleeve integrally attached to the outer cylnder, into a nozzle chamber integrally attached to the inner cylinder, and then passes through the nozzles and rotating blades of the control stage. At this point, the steam from the several parallel inlet paths merges together and then flows through the rest of the high-pressure turbine blading comprised of an array of interleaved stationary and rotating blade rows.

The bell seal assembly forms the connection between the inlet sleeve and its associated nozzle chamber, accommodating some relative motion and misalignment between them while simultaneously sealing against leakage of the supply steam entering the turbine into the space between the outer and inner cylinders, which space contains steam at a considerably lower pressure.

Because of the nature of the fluid flow, in a typical case being steam at pressures ranging from 2400 to 3500 p.s.i., generally at temperatures of 1000° F., there are problems of thermal shock, thermal expansion, and manufacturing alignment tolerances which mandate that a highly versatile seal be provided. Further, the seal must also remain stable under conditions of pulsating pressure, and must resist vibration, wear and loss of effective sealing contact in use.

In many prior art sealing application, a bell type seal has generally been settled upon as standard. The characteristic bell or flanged cylinder shape of the seal is such that it may be positioned and retained relative to the inlet sleeve forming a part of the outer cylinder by a special retaining nut which in turn allows the seal the predetermined amount of "float", or free but limited movement, which is required for proper centering and sealing action.

In the upper half of the turbine cylinder, the flange of the bell seal unit is retained by an upwardly directed shoulder surface portion of the retaining nut and a lower end face sealing surface on the inlet sleeve. The skirt of the bell seal extends in a downstream direction and enters a skirt-receiving annular groove formed in the nozzle chamber. In use, high pressure in the inlet sleeve passage serves to move the bell unit slightly axially upstream into the end face sealing relation just described. The lower margin of the skirt expands thermally into a generally fluid-tight contact with an oppositely directed cylindrical sealing surface of the nozzle chamber annulus.

While this general arrangement has been known and is considered perhaps the most satisfactory, like all other difficult sealing installations, it is considered capable of still further improvement. Because of the conditions under which the turbine is operated, the seal assembly is exposed to severe temperature differtials, extreme pressure gradients and rapid pressure fluctuations. When these forces cause leakage around the seal periphery, transient pressures may cause further misalignment, noise, chatter and, very often, a resonant movement of the parts relative to each other in and around the seal cavity region. These problems can cause accelerated sealing failure, particularly where the surfaces are damaged by the resulting vibration. In some cases, vibration is so extreme that loud noise is created, and abrasion of the bell skirt and the nozzle chamber wall results. Ultimately, this may result in cracks and fissures in the bell seal or elsewhere in the inlet sleeve or the nozzle chamber.

Unfortunately, however, the clearances allowing this movement may not simply be eliminated. The bell must be free to move axially to create the proper end face seal, to move radially for alignment, and to expand radially to create the peripheral side wall seal which will withstand the extreme pressures and thermal gradients referred to. During shutdowns, after extended use for maintenance or otherwise, the parts must "shrink" to a thermally relaxed condition which will provide sufficient clearance for the inner and outer cylinders to be removed from each other without damage. These seals or other components may then be replaced and re-installed as needed.

In view of the failure of the prior art to provide a completely satisfactory seal, it is a general object of the present invention to provide an improved bell seal assembly.

Another object of the invention is to provide a bell seal assembly using a bell seal having a particular arrangement of bell seal skirt to reduce noise, vibration and damage to seal and/or the seal-receiving groove in the nozzle chamber.

A further object of the invention is to provide a seal which is capable of improved performance without requiring materials which are significantly more expensive or difficult to work with than those presently in use.

A still further object of the invention is to provide a seal which will provide improved functioning without measurably increased cost of manufacture.

Another object of the invention is to provide a bell seal having a skirt which is subdivided into a sealing land region and a grooved taper cone region to create improved stability.

A further object of the invention is to provide a seal assembly which includes a bell having a skirt portion with its lower margin subdivided into a seal land region and a grooved taper cone region, with the associated parts of the seal cavity sidewall sealing surface having a hardfaced coating thereon for increased wear resistance.

A still further object of the invention is to provide a bell seal assembly wherein portions of the skirt and the nozzle chamber cooperate to provide reduced excitation caused by steam pressure variations in the inlet sleeve and the seal cavity.

Yet another object is to provide a seal assembly wherein what leakage does occur tends to dissipate by itself rather than undergoing a resonant vibration of increasing amplitude.

These and other objects and advantages of the invention are achieved and practiced by providing a bell seal assembly having a bell unit with a radially extending flange having an upwardly directed end face sealing surface and a lower flange support surface, a skirt portion with an upper margin, an intermediate portion having a primary sealing land and a lower skirt margin having a grooved taper cone to impart stability to the seal; preferably the sealing surface of the nozzle chamber is hardfaced to resist abrasion in use.

The manner in which these and other objects and advantages of the invention are achieved in practice will become more clearly apparent when reference is made to the following detailed description of the preferred embodiment of the invention set forth by way of example, and shown in the accompanying drawings, and where like numbers indicate corresponding parts throughout the several figures.

BRIEF DESCRIPTION OF THE DRAWINGS

FIG. 1 is a fragmentary vertical sectional view showing certain major elements of a steam turbine with which the novel bell seal assembly of the invention is associated in use; and FIG. 2 is an enlarged view, partly in section and partly in elevation, showing the construction of certain elements of the bell seal assembly of the invention.

DESCRIPTION OF THE PREFERRED EMBODIMENTS OF THE INVENTION

While it will be understood that the seal of the invention may be used in various applications, a preferred form of seal will be described wherein the seal extends between portions of the inner an outer cylinders of a high pressure steam turbine of the type customarily used in public utility applications. Likewise, while the drawings illustrate a form of seal wherein the skirt portion of the bell is directed downwardly, and the flange is on the top, and wherein the steam flow enters the turbine from the top, and flows downwardly from the outer to the inner cylinder, these parts might be positioned in any orientation. In the following specification, and in the claims, therefore, unless specifically indicated otherwise, the expression "upper" means lying toward or facing the upstream direction of steam flow, and "lower" or "bottom" means lying toward or facing the downstream direction of steam flow.

Referring now to the drawings in greater detail, FIG. 1 shows a portion of a high pressure turbine assembly generally designated 10 and shown to include, as one of its principal elements, a rotor assembly generally designated 12 and mounted for rotation about a center line 14. The rotor assembly 12 carries a plurality of control stage rotor blades 16 arranged in a single row, and a plurality of high pressure stage rotor blades 18 affixed to the rotor body 20. These blades 18 are arranged in rows of gradually increasing diameter in the axial direction of steam flow.

Another principal element of the turbine 10 is a so-called outer cylinder assembly generally designated 22, which is concentrically disposed with respect to an inner cylinder assembly generally designated 24, to which detailed reference is made elsewhere herein. The inner cylinder assembly 24 positions a stator assembly generally designated 26; the stator assembly 26 positions a plurality of fixed stator blades 28 arranged in rows and interleaved with their counterpart rows of blades 16 on the rotor 12 in a manner well-known to those skilled in the art. In use, steam passing through the control stage blading 16 is directed from a control stage chamber 30 around a nozzle chamber generally designated 32 before flowing in the passage 31 between the rows of blades 18, 28 comprising the various stages of the high presure turbine.

As is also shown, a steam outlet annulus 34 is formed between the inner and outer cylinders 24, 22. Steam passing through this annulus 34 is directed to means in the form of an outlet 36 which, as is known to those skilled in the art, may lead the steam back to the reheater section of the steam generator. Thereafter, the steam returns to the turbine and may pass through an intermediate pressure turbine element and a low pressure turbine element, finally exhausting to the condenser (not shown).

FIG. 1 also shows that a seal assembly generally designated 38 and embodying the inventive concept is provided for the purpose of making an effective seal between appropriate portions of an inlet sleeve unit generally designated 40 which is welded or otherwise affixed to a part of the outer cylinder 22 to become a part thereof, and parts of a nozzle chamber 32, which is cast or otherwise integrally formed as a part of the inner cylinder 24. It is the relative movement of these elements under thermal expansion and high pressure steam flow which dictates the severe requirements for the seal of the invention.

Referring now in particular to FIG. 2, the seal assembly 38 per se is shown to include two principal elements, a bell seal unit generally designated 42 and a retaining nut unit generally designated 44. In use, the retaining nut positions the bell seal with respect to the particular areas of the inlet sleeve 40 and the nozzle chamber 32 which are necessary to provide not only the sealing surfaces, but which will also accommodate the movement which necessarily takes place between these associated parts. In this connection, the seal of the invention may be thought of as a static seal in the sense that there is no repeated rotary or long travel oscillating motion between parts. However, there is definite radial growth of the bell seal skirt, and definite axial movement of the bell as a whole in response to the internal pressure which is necessary to operate the turbine. In bell seals, this pressure is taken advantage of to insure that a positive seal is formed. The bell may also shift radially for alignment purposes.

In the preferred construction shown, the inlet sleeve 40 includes a main sleeve body 46 with a generally cylindrical, smooth inside diameter surface 48 defining a main inlet passage 50 for incoming steam which in use moves within the passage 50 in the direction of the arrows in FIGS. 1 and 2. The sleeve body 46 also includes an outer diameter surface 52, and a counterbore 53 defined in part by screw threads 54 extending between a contoured shoulder 56 at the upstream end of the threaded counterbore 53 and a machined bottom end face sealing surface 58 at the lower or downstream end thereof.

Referring now to the nozzle chamber 32, FIGS. 1 and 2 show this unit to include a main body portion 60 having a generally cylindrical outside diameter surface 62 (FIG. 1), and a radially inwardly directed sidewall sealing surface 64. Portions of this surface 64 preferably include a hardfaced overlay surface 66 made from a refractory, abrasion resistant surface such as a "tribaloy" (cobalt-chromium-molybdenum) steel alloy, and ground to a fine surface finish.

The surface 64 terminates in a radial shoulder surface 68 which joins a lowermost nozzle chamber inner sidewall 70 which forms the lower part of the inlet passage 50. The seal cavity as a whole, designated 72 in FIG. 2, thus comprises enlarged diameter portions of the nozzle chamber 60 which receives the retaining nut 44 and the bell seal unit 42.

Referring now to the elements of the seal assembly per se, this unit 38 includes the bell seal unit generally designated 42, having a body 74, formed of a radially inwardly extending flange portion 76 and a depending skirt portion 78.

As best shown in FIG. 2, the flange 76 includes a radially extending, machined upper end face sealing surface 80 disposed in facing relationship to the inlet sleeve bottom 58, an axially extending inside diameter surface 82 and a lower flange support surface 84 which is adapted to be engaged by a support flange surface 86 on the nut 44.

Referring now the skirt portion 78 of the bell seal unit 42, this skirt is shown to include an upper skirt surface 88, an intermediate portion 90 having a raised level portion 91, a lower skirt margin 92, and a skirt end surface 93. The lower margin, generally designated 92, includes a plurality of circumferentially extending grooves 94 formed in a taper cone surface 96, which has a slight angle of departure 98 with respect to the cylindrical surfaces 64, 66. In the preferred form, the circumferential grooves 94 terminate adjacent the surface 90; this surface is the primary sealing surface and is formed as a wide land of increased diameter relative to the upper skirt surface 88.

Referring now to another element of the seal assembly 38, the retaining nut unit 44 is shown also to include a retaining nut body 100 having a smooth inside diameter surface 102, and a flat upper end face 104 disposed oppositely to and in some cases engaging the sleeve shoulder 56. The nut 44 includes a threaded outside diameter surface 106 which cooperates with the threads 54 formed in the inlet sleeve threaded counterbore 53.

Referring now to the assembly of the seal for use, when the turbine unit 10 is to be assembled, the lower part of the inner cylinder is positioned relative to the rotor 20 in a known manner, and the upper half of the inner cylinder 24 is then positioned over the lower half with the stator and rotor blades interleaved. The upper half of the inner cylinder 24 is then affixed to the lower half of the inner cylinder. This then leaves one or more nozzle chamber portions which are then disposed in facing relation to the outer cylinder 22 prior to assembly of these parts. Before this assembly is completed, however, and referring specifically to FIG. 2, the bell unit 42 is positioned with its flange 76 in overlying relation to the flange surface 86 on the retaining nut 44. The nut and bell seal are then raised as a whole into the position shown in FIGS. 1 and 2 relative to the lower or outlet portion of the inlet sleeve 46. Then, the retaining nut threads 106 are engaged with their counterparts 54 on the inlet sleeve body 46 and the nut 44 is rotated until a pre-calculated clearance, preferably about 0.1 mm (0.004 inches) is provided between the opposed faces 90, 58 of the bell seal flange 76 and the inlet sleeve body 46. At this point, the outer cylinder 22 is guided into position over the inner cylinder 24 with the inlet sleeve 46 and the nozzle chamber 32 aligned such that the seal skirt 74 registers with the surfaces 64, 66 in the nozzle chamber body 60.

As the parts are assembled, there will be a very slight working clearance or at most a slight interference fit between the sealing land 90 and the inner sealing hardfaced surface 66 of the nozzle chamber body 60. When the outer cylinder 22 rests securely in its proper position overlying the inner cylinder 24, the bell seal assembly 38 will have the approximate orientation shown in FIG. 2. Preferably, the 0.1 mm free play or clearance "C" shown in FIG. 2 will be present as shown, provided gravity draws the bell unit downwardly.

When it is time for operation of the turbine, appropriate steam valves are manipulated and high pressure steam flows through the passage 50 in the inlet sleeve 46 and through appropriate passages 30, 31 in the turbine 10. The arrows in FIG. 1 show this flow. The pressurized steam in the inlet passage 50 tends to escape therefrom about the periphery of the bell seal unit 42. However, the pressure beneath and radially inside of the seal has two effects which act to prevent leakage. The first is that the steam pressure inside the chamber acts on the lower radial surface 84 of the bell flange 86, pushing it axially upwardly or upstream, thus urging the entire bell seal body 74 as a whole upwardly toward fluid-tight engagement of the opposed faces 58, 80. The steam pressure within the skirt of the bell unit tends to bow or bend the skirt 74 outwardly, and the combination of this force with the thermal expansion occasioned by the 1000° F. temperature forces the land surface 90 on the intermediate skirt portion into fluid-tight engagement with the hardfaced surface 66 of the nozzle chamber 60.

While the invention is not to be taken as being limited to any particular theory or principle of operation, it is believed likely that providing a taper cone section having grooves therebelow for "tripping" the vortices occasioned by seal leakage flow creates a more stable and effective seal.

In the prior art, where a lower portion of the skirt was sealed, intermittent leakage would cause irregular or uneven skirt movement, vibration, and even undesired resonance of these parts as the steam was permitted to escape intermittently. This was believed to be caused by the fact that pressure drop created a resonant response in the bell unit. With the present construction, the grooves 94 are positioned in the taper cone of the skirt so leakage flow is controlled. Leakage, if any, occurs in an area where the steam must flow through a passage of decreasing diameter, and wherein a groove lies just adjacent the land creating the primary seal. The grooves are though to create flow separation for reduced instability of the seal. The provisions of a relatively extended taper cone rather than a cylindrical lower margin tends to cushion the seal.

Also, the hardfaced overlay helps reduce any nicking or other damage to the wall of the nozzle chamber, with the result that a more effective, longer lasting seal in created.

Referring now to the materials used in making the seals of the invention, and to make the associated turbine parts, the seals are customarily made from alloy steel materials which resist thermal shock and have carefully controlled expansion properties. Preferably, the coefficient of the thermal expansion of the bell seal should be slightly greater than that of the surrounding parts so that the seal will "grow" into tighter sealing engagement at the elevated temperatures encountered in turbine use, and "shrink" for removal and replacement at room temperature. These coefficients need not be large, however, in view of the 1000° F. temperatures normally characterizing the high pressure steam operating the turbines.

A typical inlet sleeve is preferably a forged steel alloy with a content of a 2.25% Cr and 1.0% W. The outer cylinder is an alloy casting having a content of 1.25% Cr, and 0.5% W. The bell seal itself is a cobalt-chromium-tungston-based alloy, preferably with 40-47 Rockwell "C" hardness; such material is available under the trade designation "Stellite 6". The alloy is typical of materials used in valve seats, for example, and has moderate hardness, thermal expansion greater than that of the surrounding components, high temperature strength and good resistance to thermal shock. The hardfaced overlay may also be made from this material.

While reference is made to steam as the medium used to supply energy for operating the turbine, it is understood that the invention might also find application with other pressurized fluids, such as hot air, or other hot gases. Hence, the generic expression "elastic fluid" is sometimes used here and in the claims to describe steam or other such fluid.

It will thus be seen that the present invention provides a novel seal unit having a number of novel advantages and characteristics, including those referred to specifically herein and others which are inherent in the invention. A preferred form of seal unit of the invention having been described in detail, by way of example, it is anticipated that the variations in the described form of construction may occur to those skilled in the art, and that such variations may be made without departing from the spirit of the invention or the scope of the appended claims.

We claim:

1. A bell seal assembly comprising, in combination, a bell seal unit and a retaining nut unit, said bell seal unit including a radially inwardly extending flange with an upper end face sealing surface, a lower seal flange support surface, and a generally cylindrical skirt portion depending from said flange and terminating in a skirt end surface, said skirt portion being adapted to be positioned in telescoping relation within a portion of an associated nozzle chamber, said nozzle chamber portion including a cylindrical sidewall sealing surface, said skirt portion having its outer surface subdivided into an upper skirt surface, an intermediate portion and a lower skirt margin, said intermediate portion comprising a primary skirt seal region having at least one circumferentially extending, continuous cylindrical sealing land portion of enlarged diameter relative to said upper skirt surface, said lower skirt margin being tapered inwardly toward and joining said skirt end surface, said lower skirt margin also including a plurality of spaced apart, circumferentially extending grooves, one of which terminates adjacent the lower eged of said sealing land, said sealing land being adapted in use to be spaced closely apart by no more than a working clearance from said sidewall sealing surface of said nozzle chamber when said seal is at a given, lower temperature and to be urged into snug radial sealing engagement with said sidewall sealing surface of said nozzle chamber when said nozzle chamber and said seal unit are at an elevated temperature, said bell unit being positioned by said retaining nut for free but limited axial movement such that said upper end face sealing surface is spaced just apart from a cooperating bottom end face sealing surface on an associated inlet sleeve, but is movable to a position of end face engagement with said inlet sleeve lower end face surface in response to an increase in fluid pressure in the interior of said seal assembly.

2. In combination, a bell seal assembly and a nozzle chamber unit, said bell seal assembly comprising a bell seal unit and a retaining nut unit, said bell seal unit including a radially inwardly extending flange with an upper end face sealing surface, a lower seal flange support surface, and a generally cylindrical skirt portion depending from said flange and terminating in a skirt end surface, a nozzle chamber having a radially inwardly directed sidewall sealing surface formed therein, said bell seal skirt being positioned in telescoping relation within a portion of said sidewall sealing surface, said skirt portion having its outer surface subdivided into an upper skirt surface, an intermediate portion and a lower skirt margin, said intermediate portion comprising a primary skirt seal region having at least one circumferentially extending, continuous cylindrical sealing land portion of enlarged diameter relative to said upper skirt surface, said lower skirt margin being tapered inwardly toward and joining said skirt end surface, said lower skirt margin also including a plurality of spaced apart, circumferentially extending grooves, one of which terminates adjacent the lower edge of said sealing land, said sealing land being spaced closely apart in use by no more than a working clearance from said sidewall sealing surface of said nozzle chamber when said seal is at a given, lower temperature and being urged into snug radial sealing engagement with said sidewall sealing surface of said nozzle chamber when said nozzle chamber and said seal unit are at an elevated temperature, said bell unit being positioned by said retaining nut for free but limited axial movement such that said upper end face sealing surface is spaced just apart from a cooperating bottom end face sealing surface on an associated inlet sleeve, but is moveable to a position of end face engagement with said inlet sleeve bottom end face surface in response to an increase in fluid pressure in the interior of said seal assembly.

3. A combination as defined in claim 2 wherein the portion of said sidewall sealing surface on said nozzle chamber includes a hardfaced metal alloy overlay forming a part thereof, said overlay being ground to a smooth surface and engaging said land on said bell seal unit in use.

4. A combination as defined in claim 3 wherein said hardfaced alloy overlay is made from a cobalt-chromium-molybdenum steel alloy.

5. In an elastic fluid turbine having a turbine rotor assembly, said turbine further including an inner cylinder unit surrounding said rotor assembly and an outer cylinder unit surrounding said inner cylinder unit, said inner cylinder having at least one nozzle chamber intergrally affixed thereto, said nozzle chamber including a radially inwardly directed sidewall sealing surface, and said outer cylinder including at least one inlet sleeve intergrally attached thereto, said inlet sleeve having a bottom end face sealing surface and being received in telescoping relation to said nozzle chamber in said inner cylinder, and a bell seal assembly carried by said inlet sleeve and having portions engaging portions of said inlet sleeve and said nozzle chamber respectively in fluid-tight sealing engagement when said seal, said chamber and said sleeve are at an elevated temperature, said bell seal assembly comprising a bell seal unit and a retaining nut removably received within the inside diameter of said inlet sleeve and positioning said bell seal unit for free but limited movement therein, with said bell seal unit including a radial flange and a generally cylindrical skirt portion depending from said flange and terminating in a skirt end surface, the improvement comprising said skirt portion having its outer surface subdivided into an upper skirt surface, an intermediate portion and a lower skirt margin, said intermediate portion comprising a primary skirt seal region having at least one circumferentially extending, continuous cylindrical sealing land portion of enlarged diameter relative to said upper skirt surface, said lower skirt margin being tapered inwardly toward and joining said skirt end surface, said lower skirt margin also including a plurality of spaced apart, circumferentially extending grooves, one of which terminates adjacent the lower edge of said sealing land, said sealing land being said portion of said bell seal assembly which engages said sidewall sealing surface, said bell unit being positioned by said retaining nut for free but limited axial movement such that its upper end face sealing surface is spaced just apart from said bottom end face sealing surface on said inlet sleeve, but is moveable to a position of end face engagement with said inlet sleeve bottom end face surface in response to an increase in fluid pressure in the interior of said seal assembly.

6. A bell seal assembly for use in a steam turbine having inner and outer cylinders which respectively include a nozzle chamber and an inlet sleeve, said bell seal assembly comprising a bell seal unit and a retaining nut unit, said bell seal unit including a radially inwardly extending flange with an upper end face sealing surface, a lower seal flange support surface, and a generally cylindrical skirt portion depending from said flange and terminating in a skirt end surface, said skirt portion having its outer surface subdivided into an upper skirt surface, an intermediate primary seal surface and a lower skirt margin, said lower skirt margin being tapered inwardly toward and joining said skirt end surface, said lower skirt margin also including a plurality of spaced apart, circumferentially extending grooves, one of which terminates adjacent the lower edge of said primary seal surface on said intermediate portion of said bell seal skirt.

* * * * *